United States Patent [19]

Sumino et al.

[11] Patent Number: 6,156,853
[45] Date of Patent: Dec. 5, 2000

[54] DEPOSIT SUPPRESSANT COMPOSITION FOR A POLMERIZATION REACTOR AND A METHOD OF POLYMERIZING VINYL MONOMERS WITH USE OF SAID DEPOSIT SUPPRESSANT COMPOSITION

[75] Inventors: Takeshi Sumino; Tetsuyoshi Yano, both of Niihama; Masayuki Murashige, Funabashi, all of Japan

[73] Assignee: Sumitomo Chemical Company, Limited, Osaka-fu, Japan

[21] Appl. No.: 09/340,121

[22] Filed: Jun. 28, 1999

Related U.S. Application Data

[63] Continuation of application No. 07/814,819, Dec. 31, 1991, abandoned.

[30] Foreign Application Priority Data

Jan. 30, 1991 [JP] Japan ................................ 3-009677

[51] Int. Cl.[7] .......................................................... C08F 2/00
[52] U.S. Cl. ............................................ 526/62; 526/202
[58] Field of Search .................................................. 526/62

[56] References Cited

U.S. PATENT DOCUMENTS

| 4,200,712 | 4/1980 | Cohen | 526/62 |
| 4,228,130 | 10/1980 | Cohen | 422/131 |
| 4,431,783 | 2/1984 | Walker et al. | 526/62 |
| 4,555,555 | 11/1985 | Toyooka et al. | 526/62 |
| 5,147,948 | 9/1992 | Masuko et al. | 526/202 |

FOREIGN PATENT DOCUMENTS

| 27466 | 4/1981 | European Pat. Off. . |
| 0440952 | 8/1991 | European Pat. Off. . |
| 30343 | 10/1970 | Japan . |
| 132907 | 6/1987 | Japan . |
| 363 | 1/1990 | Japan . |

*Primary Examiner*—Christopher Henderson
*Attorney, Agent, or Firm*—Birch, Stewart, Birch & Kolasch LLP

[57] ABSTRACT

Disclosed are a deposit suppressant composition for the internal surfaces of a polymerization reactor for polymerizing a vinyl monomer, including a polyhydric phenol sulfide compound having an average molecular weight of about 500 to 5000, as well as a method of polymerizing a vinyl monomer wherein prior to the polymerization, the internal surfaces of a polymerization reactor are coated with the deposit suppressant composition.

6 Claims, No Drawings

DEPOSIT SUPPRESSANT COMPOSITION FOR A POLMERIZATION REACTOR AND A METHOD OF POLYMERIZING VINYL MONOMERS WITH USE OF SAID DEPOSIT SUPPRESSANT COMPOSITION

This application is a continuation of application Ser. No. 07/814,819, now abandoned, filed on Dec. 31, 1991, the entire contents of which are hereby incorporated by reference.

FIELD OF THE INVENTION

The present invention relates to a deposit suppressant composition for the internal surfaces of a vinyl-polymerization reactor and a method of polymerizing vinyl monomers with use of said deposit suppressant composition.

BACKGROUND OF THE INVENTION

A problem with the polymerization of vinyl monomers is the development of a progressive deposit on the internal surfaces of a polymerization reactor, more specifically on the internal wall of the reactor and the surfaces of the impeller, baffles and so on.

A deposit on the internal surfaces of a polymerization reactor not only detracts from the reactor cooling efficiency but, upon detachment of the deposit and entry of the deposit into the product polymer, adversely affects the quality of the product polymer. Furthermore, much labor and time are required for removal of the deposit after the polymerization reaction. Therefore, more than a few methods comprising application of build-up suppressants have heretofore been proposed.

For example, Japanese Examined Patent Publication (Kokoku) No. 30343/1970 teaches the use of polar organic compounds such as thioethers. Japanese Examined Patent Publication No. 363/1990 discloses condensates of phenolic compounds with formaldehyde or benzaldehyde. Japanese Unexamined Patent Publication (Kokai) No. 34241/1989 (EP0027466) discloses a reaction product of a thiodiphenol and a bleaching agent. U.S. Pat. No. 4,555,555 describes condensates of pyrogallol or hydroxyhydroquinone with aromatic aldehydes. U.S. Pat. No. 4,431,783 teaches a 1-naphthol-formaldehyde condensate. Japanese Unexamined Patent Publication No. 132907/1987 teaches polysulfide rubbers.

However, some of these proposed suppressants tend to reduce the polymerization rate or detract from the quality of the product polymers, while others are not sufficient in the suppressant effect or only effective for a limited time. Thus, all of them remain to be improved.

SUMMARY OF THE INVENTION

The present invention provides a deposit suppressant composition for the internal surfaces of a polymerization reactor for polymerizing vinyl monomers, which comprises a polyhydric phenol sulfide compound having an average-molecular weight of about 500 to 5000.

The present invention further provides a method of polymerizing vinyl monomers wherein prior to the polymerization, the internal surfaces of a polymerization reactor are coated with a deposit suppressant composition and then the polymerization is carried out, the method being characterized in that the deposit suppressant composition comprises a polyhydric phenol sulfide compound having an average molecular weight of about 500 to 5000.

DETAILED DESCRIPTION OF THE INVENTION

The polyhydric phenol constituting the polyhydric phenol sulfide compound mentioned above is a phenol compound having two or three —OH groups and may have substituents such as hydrocarbon groups of 1 to 3 carbon atoms, particularly alkyl groups, halogens or the like on the aromatic ring thereof.

Preferred examples of such a polyhydric phenol compound are resorcinol, hydroquinone, catechol, hydroxyhydroquinone, pyrogallol, phloroglucinol and so on.

In the polyhydric phenol sulfide compound, the average number of polyhydric phenol units is about 4 to 30, preferably about 8 to 15, and the polyhydric phenol units may be the same or different. The number of intervening sulfur atoms between adjacent polyhydric phenols is 1 to 8 on the average.

The average molecular weight, as determined by gel permeation chromatography (GPC) based on standard polystyrene is about 500 to 5000, preferably about 800 to 3000. The average molecular weight herein is indicated in terms of weight average molecular weight. If the molecular weight is less than the above range, the deposit suppressant effect will not be sufficient, nor will it last long, while an excessive molecular weight tends to make the coating operation difficult.

A variety of processes are available for the production of the polyhydric phenol sulfide compound of the invention. An exemplary process comprises condensing said polyhydric phenol compound with sulfur monochloride.

For this reaction, a polyhydric phenol is first dissolved in an organic solvent inert to sulfur monochloride. The organic solvent mentioned just above includes aromatic hydrocarbons such as toluene, xylene, chlorobenzene, etc., ethylene dichloride, chloroform, ethyl acetate and so on. Then, sulfur monochloride is slowly added to the solution with heating and stirring.

The amount of sulfur monochloride to be used is about 0.5 to 2 moles, preferably about 0.9 to 1.2 moles, per mole of the polyhydric phenol.

The reaction temperature may range from about 50° C. to about 150° C., preferably about 80° C. to about 120° C.

Though it depends on the molecular weight of the product polyhydric phenol sulfide compound, the reaction time may generally range from about 0.5 to about 5 hours.

When the reaction is conducted in an open system, the byproduct hydrogen chloride formed with the progress of reaction may be let off under atmospheric pressure. In a closed system, a suitable hydrochloric acid acceptor such as triethylamine can be employed.

After completion of the reaction, the reaction product, if present in solution, can be recovered by evaporating the solvent. If the reaction product has precipitated out in the reaction mixture, it can be isolated by a solid-liquid separation technique, for example by filtration.

It is preferable to heat the thus obtained polyhydric phenol sulfide compound at about 80° C. to about 200° C. for about 1 to about 10 hours. This heat treatment can further improve the deposit suppressant effect.

For use as a deposit suppressant composition for the internal surfaces of a polymerization reactor, the polyhydric phenol sulfide compound is dissolved in a solvent. That is to say, the deposit suppressant composition of the invention is usually in the form of a solution of the polyhydric phenol sulfide compound in a solvent capable of dissolving the polyhydric phenol sulfide compound.

The solvent mentioned above is preferably a solvent that can be easily evaporated and is capable of dissolving the polyhydric phenol sulfide compound. Examples of such solvents include various organic solvents such as lower alcohols, particularly $C_1$–$C_4$ saturated aliphatic alcohols, e.g. methanol, ethanol, etc.; various ketones, particularly di($C_1$–$C_4$ alkyl) ketones, e.g. acetone, methyl ethyl ketone, methyl isobutyl ketone, etc.; $C_2$–$C_3$ aldehydes such as acetaldehyde or proprionaldehyde, tetrahydrofuran, esters of $C_1$–$C_3$ fatty acid (such as formic acid, acetic acid or propionic acid) with $C_1$–$C_4$ alcohols (such as methyl, ethyl, propyl or butyl alcohol), e.g. ethyl acetate, etc. as well as aqueous alkali solutions. Among the aqueous alkali solutions, aqueous solutions of alkali metal hydroxide such as NaOH or KOH, etc. can be mentioned, and the preferred concentrations of such aqueous solutions are about 0.5 to 10 percent by weight.

The concentration of the polyhydric phenol sulfide compound in the final deposit suppressant solution is not critical so far as the solution is suited for coating purposes, and generally may range from about 0.001 to about 50 g per 100 ml of the solvent.

The use of such a solution of the polyhydric phenol sulfide compound as a deposit suppressant composition involves no further step than coating the internal surfaces of the polymerization reactor with the solution.

The term "internal surfaces of a polymerization reactor" used herein is intended to mean all the surfaces that will come into contact with the charged monomer, such as the surfaces of the internal wall, impeller shaft, blades and baffles, etc. and the inner surfaces of the reflux condenser, conduits and so on. The material or materials constituting such internal surfaces need not be extraordinary but may be any of the conventional materials such as stainless steel, glass, etc. for all practical purposes.

The method for application of the deposit suppressant composition of the invention to the internal surfaces of a polymerization reactor is not critical only if the surfaces can be adequately coated. A well-known methods can be used, such as spraying the internal surfaces of the reactor with the composition or filling the reactor with the composition and withdrawing the composition. For commercial large-scale operation, any of the known automatic coating methods as described in Japanese Unexamined Patent Publications No. 61001/1982, No. 36288/1980 and No. 11303/1984, for instance, can be utilized.

The amount of the deposit suppressant composition to be applied to the internal surfaces of a polymerization reactor is about 0.01 to 10 g/m$^2$ in terms of the polyhydric phenol sulfide compound. If the amount is less than 0.01 g/m$^2$, the deposit suppressant effect will be inadequate and will not last long. The use of the composition in an amount of more than 10 g/m$^2$ will not achieve further remarkable improvement in the desired effect.

The above coating of internal surfaces of the polymerization reactor with the deposit suppressant composition of the invention is performed prior to polymerization of the vinyl monomer. In the batch polymerization process, the coating operation can be carried out before every batch reaction but since the deposit suppressant effect of the composition is remarkable, several batches of reaction can be consecutively conducted after each coating operation and, after checking for the degree of deposition, another coating procedure can be carried out.

In the case of continuous polymerization, the optimal next coating time can be determined by monitoring the degree of the deposit, for example, from heat exchange efficiency.

The polymerization methods to which the deposit suppressant composition of the invention can be applied are suspension polymerization, emulsion polymerization, microsuspension polymerization, solution polymerization, bulk polymerization, gas-phase polymerization and so on, all of which are well known. The effect of the invention is particularly remarkable in suspension, emulsion or microsuspension polymerization in an aqueous medium.

The typical vinyl monomers which can be polymerized in accordance with the invention are vinyl halides such as vinyl chloride; vinyl esters such as vinyl acetate, vinyl propionate, etc., alkyl (meth)acrylates such as methyl methacrylate; esters, particularly lower alkyl esters of unsaturated dibasic acids such as maleic acid, fumaric acid, etc.; diene monomers such as butadiene, chloroprene, isoprene, etc.; styrene, acrylonitrile, vinylidene halides, vinyl ethers and so on.

These monomers can be used alone or in combination where copolymerizable, and may also be used in combination with, inter alia, acrylic acid, methacrylic acid, maleic acid or fumaric acid or the corresponding anhydrides thereof, itaconic acid, acrylamide, methacrylamide, dimethylaminoethyl methacrylate, N-methyl-olacrylamide, N-methylolmethacrylamide, 2-hydroxyethyl methacrylate, 2-hydroxypropyl acrylate, acrolein, $C_2$–$C_9$ olefins such as ethylene, propylene, and so on.

The deposit suppressant composition of the invention is particularly suited for the suppression of deposit formation in polymerizing vinyl chloride or a vinyl monomer mixture containing vinyl chloride as a major component and other monomer(s) copolymerizable therewith as a minor component. Such mixture preferably contains at least 50 wt %, preferably more than 80 wt% but less than 100 wt %, of vinyl chloride. Examples of other monomers copolymerizable with vinyl chloride are any of the above-exemplified vinyl monomers which are copolymerizable with vinyl chloride, and particularly include vinyl acetate, alkyl (meth) acrylate, especially $C_1$–$C_6$ alkyl (meth)acrylate, and the like. The deposit suppressant composition of the invention is also applicable to graft-copolymerization process wherein vinyl chloride is graft-copolymerized to an ethylene-vinyl acetate copolymer, ethylene-alkyl methacrylate copolymer, poly urethane and the like.

In the polymerization method of this invention, the polymerization initiator, the dispersing agent for use in combination with an aqueous medium, etc. may all be well-known conventional reagents, and there is no specific restriction on the polymerization temperature, time and other conditions.

For example, the suspension polymerization of a vinyl monomer can be carried out in a conventional manner in an aqueous medium such as water using a conventional dispersant (such as partially saponified polyvinyl acetate, carboxymethyl cellulose, gelatin, starch or like water-soluble macromolecular compound) and if desired an auxiliary dispersion stabilizer (such as barium sulfate or the like) and using a conventional oil-soluble initiator such as benzoyl peroxide, lauroyl peroxide, 2,2'-azobisisobutyronitrile, di-2-ethylhexyl peroxydicarbonate or the like at a temperature effective to effect the polymerization (usually about 20 to 80° C.) with stirring until the desired polymer is obtained.

Furthermore, the emulsion polymerization is also carried out in a conventional manner in an aqueous medium such as water using a conventional emulsifier (such as a salt of sulfuric acid ester of higher alcohol, alkylsulfonic acid salt or like anionic surfactant or polyoxyethylene alkyl ether or like nonionic surfactant) and using conventional water-soluble initiator (such as hydrogen peroxide, potassium persulfate, ammonium persulfate or a redox catalyst) at a temperature of about 20 to 80° C. with stirring until the desired polymer is obtained.

The microsuspension polymerization can also be carried out in a conventional manner in an aqueous medium using the conventional emulsifier and the oil-soluble initiator such as one mentioned above. In this case, the reaction system is homogenized prior to the initiation of the polymerization. Then the polymerization is effected at a temperature of, for example, about 20 to about 80° C. with stirring until the desired polymer is obtained. Such polymerization method is described, for example, in "Encyclopedia of PVC", 1976, edited by LEONARD I. NASS, MARCEL DEKKER, INC., New York, pages 88–89.

The foregoing polymerization methods per se are all well-known and conventional, and described in many publications such as "Encyclopedia of PVC" 1976, edited by LEONARD I. NASS, MARCEL DEKKER, INC., New York, pp. 76–89, U.S. Pat. No. 4,555,555 and the like, and the polymerization methods can be easily carried out by one skilled in the art.

The polyhydric phenol sulfide compound of the invention exhibits a very remarkable deposit suppressant effect when applied to the internal surfaces of a polymerization reactor for vinyl monomers. It is particularly suited for the polymerization of vinyl chloride or the like in aqueous phase. When the reactor body, impeller blades and so on are made of stainless steel, the surfaces of these members are generally finished mirror-smooth by electrolytic polishing. The polyhydric phenol sulfide compounds of the invention adhere well to such surfaces and exhibit the deposit suppressant effect for a long period of time.

The following examples are intended to-illustrate the invention in further detail and should by no means be construed to limit the scope of the invention.

EXAMPLE 1

A three-necked flask equipped with a reflux condenser and a stirrer was charged with 25 g (0.2 mole) of pyrogallol and 80 ml of ethyl acetate and heated with stirring to a temperature at which reflux of ethyl acetate took place. Then, 18 ml (0.2 mole) of sulfur monochloride was added dropwise over a period of 2 hours at the same temperature. After completion of the dropwise addition, the solvent was evaporated off to give a pyrogallol sulfide. The obtained sulfide compound was heated at 120° C. for a period of 5 hours. The molecular weight of the sulfide compound as determined by GPC was 2330 based on standard polystyrene. In the sulfide compound, the average number of pyrogallol units is estimated to be about 12, and the average number of intervening sulfur atoms between the adjacent pyrogallol units is estimated to be about 2.

EXAMPLE 2

The procedure of Example 1 was repeated except that 24 g (0.22 mole) of resorcinol was used in lieu of pyrogallol to give a resorcinol sulfide. The molecular weight of the sulfide compound was 1190 on the same basis as above. In the sulfide compound, the average number of resorcinol units is estimated to be about 7, and the average number of intervening sulfur atoms between the adjacent resorcinol units is estimated to be about 2.

EXAMPLES 3 AND 4 AND COMPARATIVE EXAMPLE 1

The polyhydric phenol sulfide prepared in Examples 1 and 2 were respectively dissolved in methanol to give two different deposit suppressant compositions each containing the sulfide compound in an amount of 0.1 g per 100 ml of methanol.

Three test pieces of electrolytically polished stainless steel plate SUS 316L, 5 cm×15 cm each, were provided, and two of them were spray-coated with the above respective two deposit suppressant compositions in an amount of 0.15 g/m$^2$ calculated as solids to form a coating film (Examples 3 and 4). The remaining one test piece was used as uncoated (Comparative Example 1).

These three test pieces were installed within a glass-lined polymerization reactor of 100-liter capacity at the level about one-third up from the bottom.

After the atmosphere was purged, the polymerization reactor was charged with 40 kg of deionized water, 25 kg of vinyl chloride, 150 g of sodium lauryl sulfate, 100 g of stearyl alcohol and 4.0 g of di-2-ethylhexyl peroxydicarbonate.

After homogenization, the charge was heated to 53° C. to initiate a polymerization reaction. After about 15 hours of reaction when the pressure had fallen by 0.5 kg/cm$^2$, the polymerization reaction was terminated and the unreacted monomer was removed. The contents were withdrawn and the amount of the deposits on each of the test pieces was determined. The results are shown in Table 1.

TABLE 1

|  | Sulfide compound | Amount of deposits (g/m$^2$) |
| --- | --- | --- |
| Example 3 | Example 1 | 5 |
| Example 4 | Example 2 | 9 |
| Comparative Example 1 | Uncoated control | 1397 |

EXAMPLE 5

The polyhydric phenol sulfide prepared in Example 1 was dissolved in methanol to provide a deposit suppressant composition containing 0.1 g of the sulfide compound per 100 ml of methanol.

The internal wall and other parts of a glass-lined polymerization reactor of 100-liter capacity which were to be exposed to the monomer charge were spray-coated with the above deposit suppressant composition in an amount of 0.1 g/m$^2$ calculated as solids to form a coating film.

Using the above polymerization reactor, the polymerization of vinyl chloride monomer was carried out in the same manner as in Example 3.

After the polymerization reaction, the contents were withdrawn and the interior of the reactor was gently rinsed with water. Then, the deposits were scraped off from the internal surfaces which had been exposed to the liquid phase. The amount of deposits was 180 g/m$^2$. There was no abnormality in the particle size or color of the product polymer.

COMPARATIVE EXAMPLE 2

The procedure of Example 5 was repeated except that the reactor was not coated with the deposit suppressant composition. The amount of deposits formed on the internal surfaces which had been exposed to the liquid phase was as large as 1090 g/m$^2$.

EXAMPLE 6

The internal wall and other parts of a stainless steel polymerization reactor of 10-liter capacity which were to be exposed to the monomer charge were spray-coated with a deposit suppressant composition of Example 1 in an amount of 0.3 g/m$^2$ calculated as solids to form a film. This polymerization reactor was charged with 4 kg of deionized water, 1.7 g of partially saponified polyvinyl acetate with a saponification degree of 80% and a viscosity of 48 cps (4% in water, at 20° C.) and 0.74 g of di-2-ethylhexyl peroxydicarbonate. After purging, the reactor was charged with 3 kg of vinyl chloride monomer and the polymerization reaction was conducted at 57° C. with stirring. When the internal pressure of the reactor had fallen by 1.5 kg/cm$^2$, the unreacted monomer was dispelled out to terminate the reaction and the contents were withdrawn. There was no deposit on the internal surfaces of the polymerization reactor.

COMPARATIVE EXAMPLE 3

The procedure of Example 6 was repeated except that the internal surfaces of the polymerization reactor was not coated with any deposit suppressant composition. The amount of deposits formed on the internal surfaces which had been exposed to the liquid phase was 103 g/m$^2$ in this case.

What is claimed is:

1. A method of polymerizing a vinyl monomer, wherein said vinyl monomer is vinyl chloride or a monomer mixture containing vinyl chloride as a major component and one or more other vinyl monomers copolymerizable with vinyl chloride, wherein prior to the polymerization, the internal surfaces of a polymerization reactor for polymerizing a vinyl monomer are coated with a deposit suppressant composition and then the polymerization is carried out, wherein the deposit suppressant composition comprises a polyhydric phenol sulfide compound having an average molecular weight of about 500 to 5000 obtained by condensing a polyhydric phenol compound with sulfur monochloride, wherein said polyhydric phenol sulfide compound has an average number of polyhydric phenol units of about 8 to 15 and is obtained by condensing a polyhydric phenol compound with sulfur monochloride at a temperature of about 50 to about 150° C., and wherein the polyhydric phenol is at least one member selected from the group consisting of resorcinol and pyrogallol.

2. A method of polymerizing a vinyl monomer according to claim 1, wherein said polyhydric phenol is pyrogallol.

3. A method of polymerizing a vinyl monomer according to claim 1, wherein said deposit suppressant composition is applied to said internal surfaces in an amount of about 0.01 to 10 g/m$^2$ calculated as said polyhydric phenol sulfide compound.

4. A method of polymerizing a vinyl monomer according to claim 1, wherein the average number of intervening sulfur atoms between adjacent polyhydric phenols is 1 to 8.

5. A method of polymerizing a vinyl monomer according to claim 1, wherein the average molecular weight of said polyhydric phenol sulfide compound is 800 to 3000.

6. A method of polymerizing a vinyl monomer according to claim 1, wherein the polyhydric phenol sulfide compound is obtained by condensing a polyhydric phenol compound with sulfur monochloride for about 0.5 to about 5 hours, the sulfur monochloride being used in an amount of about 0.5 to about 2 moles per mole of the polyhydric phenol compound.

* * * * *